Oct. 18, 1966  G. A. DOTTO  3,280,276
SEQUENTIAL TIMER
Filed Nov. 12, 1964  2 Sheets-Sheet 1
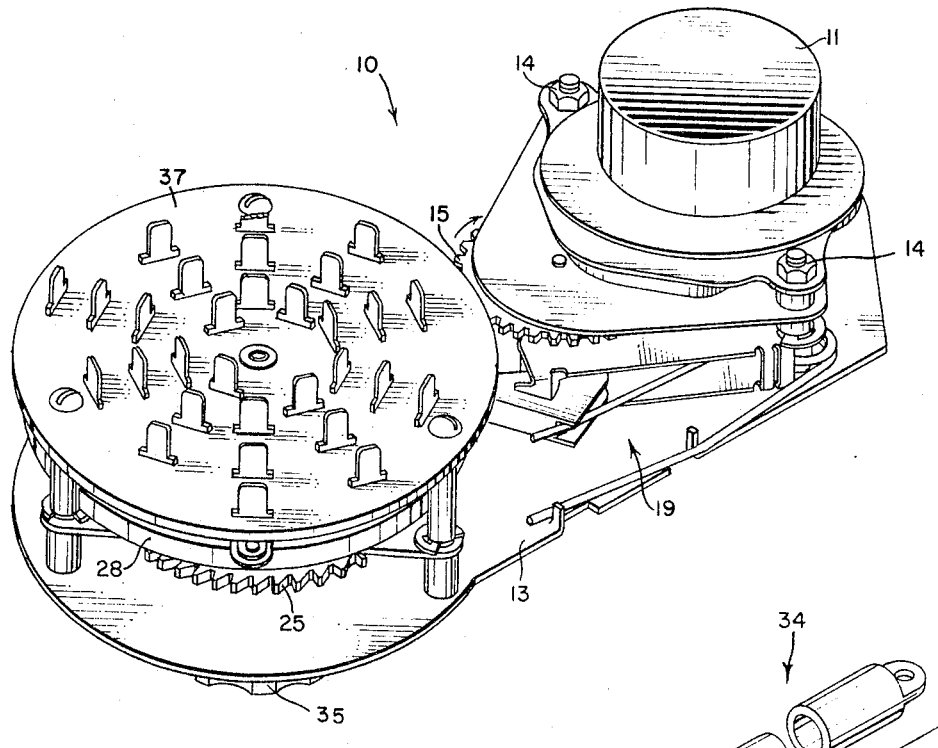
FIG. 1
FIG. 6
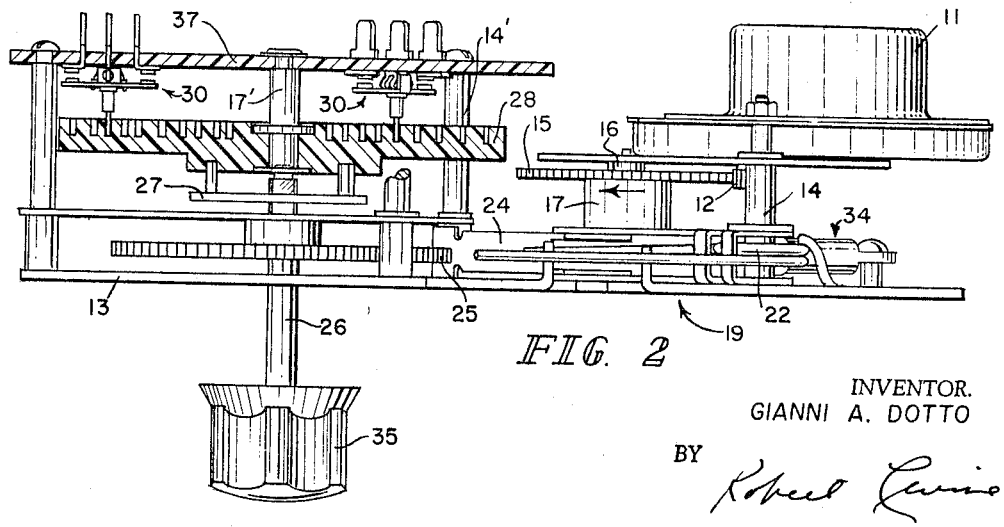
FIG. 2
INVENTOR.
GIANNI A. DOTTO
BY
Robert Lewis
ATTORNEY

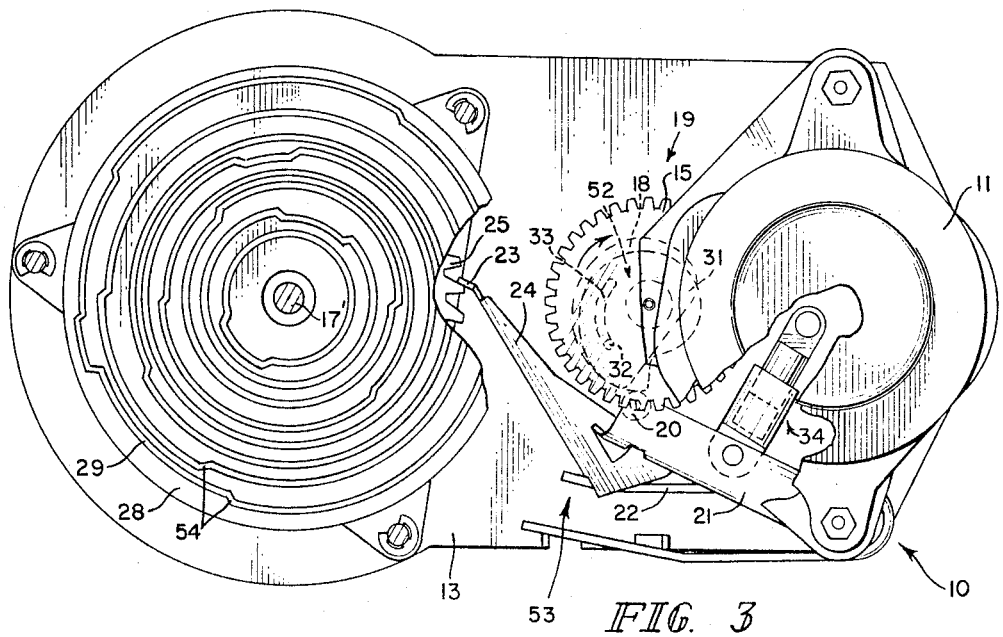
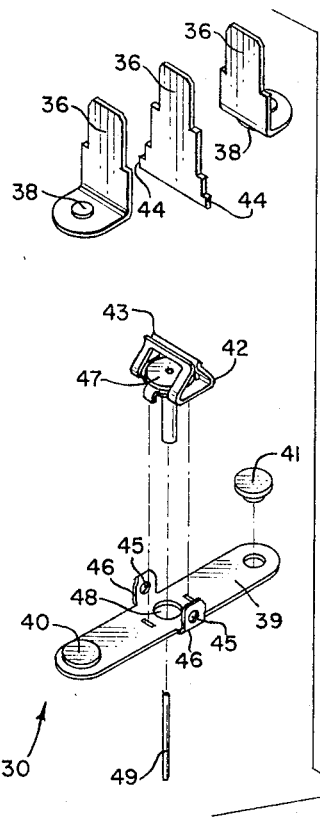
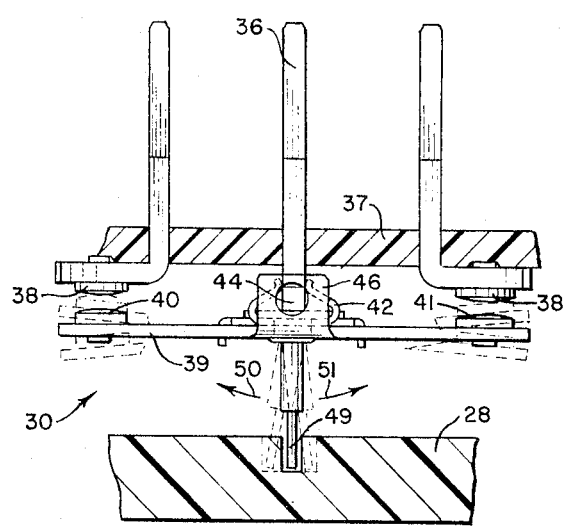

United States Patent Office 3,280,276
Patented Oct. 18, 1966

3,280,276
SEQUENTIAL TIMER
Gianni A. Dotto, Dayton, Ohio, assignor to
P. R. Mallory & Co., Inc.
Filed Nov. 12, 1964, Ser. No. 410,600
15 Claims. (Cl. 200—38)

The present invention relates to a novel control device for sequentially engaging and disengaging a plurality of switches at predetermined intervals of time within a timing cycle. The novel control device includes means for maintaining the switches in an engaged or a disengaged position for a definite interval of time.

Sequential timers are known and have found utility in the control of the sequence of operations experienced by electrical appliances such as washing machines, dishwashers, dryers and the like. As further refinements are introduced in the electrical appliance field making the appliances more commercially desirable, the need arises to redesign sequential timers to actuate the increased numbers of electrical circuitry associated with the appliance yet retain the timer as a small and compact unit. Therefore, the requirement appears for a more accurate, simple, efficient, and effective sequential timer capable of handling the increased numbers of electrical circuitry yet occupy the same or less physical space than its predecessor sequential timer.

If the sequential timer must occupy a physical area no larger than prior art sequential timers yet must be capable of actuating increased numbers of electrical circuitry, design problems of magnitude are encountered. The foremost design problems being the designing of a timer capable of actuating increased numbers of electrical circuits yet retain the same physical displacement and the designing of a means capable of developing an adequate driving torque to obtain an accurate and an efficient sequential timer. In prior art devices, to actuate the plurality of switches associated with the timer, stacks of camming means are coaxially connected to a cam shaft so as to tangentially engage a follower device of a follower switch. The respective follower devices are actuated from either an engaged position to a disengaged position with a contact means or from a disengaged position to an engaged position with a contact means depending on the angular position of the cam associated with a particular follower switch. The contours of the cam periphery determine the state of actuation of the associated follower device. It is seen that such a sequential timer, although satisfactory for its intended purpose, is nevertheless, complicated and cumbersome and requires a large torque to operate the cam stack. The use of a stacked camming device and a plurality of follower switches necessitates the use of structure having an excessive volume displacement and the use of a sizable driving means.

Therefore, it is an object of the present invention to provide a sequential timer that is relatively small thereby occupying a minimum of space in the housing of the appliance.

Another object of the present invention is to provide a novel follower switch having two engaged or closed positions and a neutral or open position.

A further object of the present invention is to provide a novel and accurate knee action escapement that translates a constant rotary motion input into an intermittent or step-by-step rotary motion output.

Still another object of the present invention is to provide a rotatable switch actuating means of unitary construction, said actuating means sequentially operating a plurality of follower switches.

Another object of the present invention is to provide a rotatable switch actuating means having concentric, radially spaced, continuous grooves cut therein, said grooves coded so as to actuate a follower means of a follower switch to one of a plurality of positions.

Yet another object of the present invention is to provide a novel follower switch that requires a reduced torque to initiate operation thereof.

Still another object of the present invention is to provide a simple, efficient, effective, and accurate sequential timing device.

A further object of the present invention is to provide an intermittent drive means having improved positive operating characteristics.

Another object of the present invention is to provide a novel follower switch having spaced contacts and a means about which the spaced contacts pivot.

Still another object of the present invention is to provide a sequential timer having optimum reliability characteristics afforded by a compact construction having a minimum number of parts.

Yet another object of the present invention is to provide a sequential timer usable in shallow depth locations.

The present invention in another of its aspects, relates to the novel features of the instrumentalities of the invention described herein for teaching the principal object of the invention and the novel principles employed in the instrumentalities whether or not these features and principles may be used in the said object and/or in the said field.

With the aforementioned objects enumerated other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate the preferred embodiment of the present invention constructed to function in the most advantageous modes devised for the practical application of the basic principals involved in the hereinafter described invention.

In the drawings:

FIGURE 1 is a perspective view of the improved sequential timer.

FIGURE 2 is a cross sectional side view of the sequential timer of FIGURE 1.

FIGURE 3 is a top view of the sequential timer of FIGURE 1 partially cut away and having the follower switches and follower switch retaining means removed to illustrate the concentric grooves of the timing cam and to illustrate the escapement.

FIGURE 4 is a perspective view of the novel follower switch of the present invention.

FIGURE 5 is a side view illustrating the cooperation between a follower switch and a groove in the timing cam.

FIGURE 6 is a perspective view of an air piston means operatively associated with the escapement.

Generally speaking, the means and methods of the present invention relate to a timing device for actuating a plurality of electrical circuits. The device generally comprises a drive means having a constant rotary motion output, an escapement means actuated by the drive means, the escapement means translating the constant rotary motion of the drive means to an intermittent motion; a ratchet wheel means actuated by the escapement means; a cam shaft fixedly coupled to the ratchet wheel means and rotatable therewith; a timing cam having a plurality of concentric grooves therein is carried by the cam shaft and rotatable therewith; and a plurality of follower switches actuated by the grooves of the timing cam to thereby open and close electrical circuits coupled to the follower switches.

More particularly the present invention relates to a timing device for sequentially actuating a plurality of electrical circuits electrically coupled to the timing device. The device includes a pair of plates in spaced parallel relationship for mounting the components of the timing device. A drive means such as a suitable prime mover is fixedly mounted on a first one of the plates. An escapement comprised of a cam assembly and a knee action means is coupled to the drive means. The escapement translates the constant rotary motion output of the drive means to an intermittent motion output. The intermittent motion output of the escapement means is transferred to a ratchet wheel means thereby driving the ratchet wheel with an intermittent motion. A cam shaft is journalled between the pair of plates. The cam shaft is coupled to and intermittently driven by the ratchet wheel means. A disc-shaped timing cam means is carried by the cam shaft. The timing cam has a plurality of concentrically disposed, substantially radially spaced, continuous grooves in one face of the cam. Each of the grooves includes coded indicia or jog segments. The coded indicia or jog segments of the timing cam determine the state of actuation of a follower switch operatively associated therewith. A plurality of follower switches are fixedly coupled to a second one of the plates or the follower switch retaining means. Each of the follower switches includes a pivotable contact carrying blade that has a contact at each extremity thereof. Fixed terminal and contact combinations are fixedly positioned in the second plate so as to be spaced from and overlie each of the movable contacts. A terminal means fixedly coupled in the second plate and a spring means both are centrally coupled to a second side of the blade. The terminal means and the spring means cooperate to provide a pivot point for the blade. A needle-shaped follower means is centrally coupled to the opposite or first side of the blade. The needle follower means rides in one of the grooves and thereby emulates the jog segments or contours of the groove. The follower means is responsive to the coded indicia or jog segments of the groove thereby pivoting the blade in accordance therewith to open and close electrical circuits coupled to the fixed contacts through their respective terminals.

Referring now to the drawings, which illustrate the preferred embodiment of the present invention, it is seen that the sequential timer means is generally indicated by numeral 10. The essential components of the aforementioned sequential timer means include a drive prime mover means 11 which is mechanically coupled to pinion 12 by any suitable means. Pinion 12 is displaced in the counterclockwise direction with substantially constant rotary motion. The drive means is secured to mounting frame 13 by a plurality of suitable retaining means 14. The plurality of retaining means 14 prevents deleterious horizontal and vertical displacement of the drive means due to vibration, abusive handling or the like. The retaining means predeterminately locates the pinion with respect to gear 15 such that the gear meshes with and is driven by the pinion in a clockwise direction with a substantially constant rotary motion. A stake 16 is fixedly connected between mounting frame 13 and the housing of the drive means. A hub 17, carrying thereon gear 15, is journalled by stake 16. Gear 15 and drive cam means 18 are fixedly coupled in spaced parallel relationship by means of hub 17. It is seen that drive means 11 rotatably motivates gear 15, thereby driving the drive cam means in the clockwise direction. The periphery of the drive cam has a predetermined rise characteristic and a predetermined fall characteristic located at a determined position on the drive cam. The hub, the gear, and the drive cam form a cam assembly means 52 which is incorporated into an escapement 19. The escapement is comprised of the cam assembly means and a knee action means 53. The knee action means comprises a roller 20 rotatably coupled to a follower arm 21, a rigid arm 24, and a ratchet wheel 25. It is seen that displacement of the roller causes a corresponding displacement of the follower arm and the rigid arm. The roller rides on the periphery of the cams of the cam assembly. As shown in the drawings, the follower arm pivots about an axis determined by retaining means 14. As roller 20 approaches the apex of the cam surface of the driving cam, the follower arm is displaced outwardly from hub 17. The outward displacement of the follower arm causes the rigid arm to be displaced outwardly from the hub. It is seen that the rigid arm has an extremity thereof pivotably coupled to an extremity of the follower arm. The outward displacement of the rigid arm causes a tension spring 22 to be displaced to a position further removed from the hub, thereby accumulating and storing energy. The outward movement of rigid arm displaces driving end 23 of the rigid arm from a position of substantially interfitting with a first tooth valley of the ratchet wheel to a position of close proximity to an adjacent tooth. It is seen that the driving end is displaced in a clockwise direction with respect to the periphery of the ratchet wheel. A pawl (not shown) is positioned to provide a guide for the rigid arm and to provide a means to prevent ratchet 48 from being displaced in the clockwise direction by the rigid arm as the rigid arm is withdrawn from the valley of a ratchet tooth. As the roller moves just beyond the apex of the rotating drive cam, the roller drops rapidly to the point on the periphery of the drive cam that is nearest to hub 17. The energy stored in the tension spring is released and acts inwardly on the rigid arm driving the rigid arm to its initial position with respect to the follower arm. The action of the rigid arm returning to its initial position with respect to the follower arm rotationally displaces the ratchet wheel in the counterclockwise direction a distance equal to the angular distance of a ratchet tooth. A cycle of the cam assembly indexes but a single tooth of the ratchet wheel which, in turn, imparts substantially the same incremental counterclockwise displacement to cam shaft 26. Cam shaft 26 has fixedly coupled thereto by means of locking means 27 a disc-shaped unitary cam 28 having a plurality of grooves 29 concentrically disposed and radially spaced in a common plane. It is seen that each of the plurality of grooves is continuous and that each of the plurality of grooves incorporates therein coded indicia or jog segments 54 that will displace a needle-like means 49 of a follower switch 30 riding in one of the grooves. The plurality of grooves and their respective jog segments are utilized to sequence the operation of the associated follower switches operatively associated therewith.

Overthrow problems are encountered as roller 20 falls along the periphery of the drive cam toward the axis of the hub. The rapid decline allows tension spring 22 to release its stored energy more rapidly than desired thereby displacing the ratchet wheel beyond the desired one tooth increment. To overcome this deleterious defect, a floating partial cam 31 which includes a pin 32 is movable within slot 33 of the drive cam. The number of intermittent operations of escapement 19 is dependent on the number of falls experienced by the follower arm during the operational period of the sequential timer.

As disclosed hereinbefore, pinion 12 rotates in the counterclockwise direction driving gear 15 in the clockwise direction. Gear 15 is staked to one extremity of hub 17 whereas drive cam 18 is staked to the opposite extremity of the hub in spaced parallel relationship. Rotational displacement of the gear displaces the drive cam in the clockwise direction. A roller riding on the periphery of the drive cam is displaced substantially in accordance with the rise and fall contours of that cam. The drive cam remains in engagement with the roller for approximately 120 degrees of the drive cam's periphery at which point the roller is transferred to the periphery of the partial cam. The partial cam is journalled in a recess (not shown) of the hub in close proximity with the drive cam thereby allowing the partial cam to have a floating characteristic on the hub. At the point of transfer an extremity of slot 33 engages the pin projection of the floating partial cam causing the roller to ride on the periphery of the floating partial cam. As the roller passes the apex of the partial cam, the roller proceeds down the decline of the partial cam toward the hub. This action rapidly displaces the partial cam in the clockwise direction approximately 135 degrees which is the length of slot 33 in terms of degrees. Upon the termination of the displacement of the partial cam, the roller again engages the periphery of the drive cam. The interaction between the drive cam, the floating partial cam, and the roller delays the fall of the roller a sufficient interval of time to prevent overthrow of the ratchet wheel by the straightening action of the rigid arm.

An air piston means 34 is fixedly coupled between the follower arm of the escapement and the mounting frame. The piston's operation is similar to that of any other conventional air piston. The piston means is used to retard the movement of the follower arm as it returns to its initial position which likewise retards the return of the rigid arm to an interfitting position with the ratchet wheel.

As disclosed hereinbefore, cam shaft 26 is fixedly coupled to the ratchet wheel. As illustrated by FIGURE 2, the cam shaft is journalled in the mounting frame and projects therethrough. A U-shaped locking means 27 is fixedly coupled to an extremity of the cam shaft. The U-shaped locking means engages recesses in unitary timing cam 28 to fixedly couple the timing cam to the cam shaft. A follower switch retaining means or plate 37, fabricated from any suitable insulating material, is fixedly coupled to mounting frame 13 in spaced parallel relationship by a plurality of retaining means 14'. Fixedly coupled to the plate and coaxial with the cam shaft is hub 17'. Hub 17' serves as a seat for the timing cam and as the axis about which the timing cam rotates. The timing cam will rotate in the counterclockwise direction as does the ratchet wheel.

The extremity of the cam shaft extending outwardly from the mounting frame has coupled thereto an indicating and adjusting knob 35. The knob carries suitable indicia indicating the function of the appliance associated with the sequential timer at any desired interval of time. It is seen that by manual rotation of the knob, either a desired sequence of operations can be selected or undesired or unwanted sequences of operation can be passed over.

A unitary timing cam 28 is fabricated from any suitable insulating material. The timing cam has provided on the surface faced toward plate 37 a plurality of concentrically disposed, radially spaced, continuous arcuate grooves 29. The exact number of concentric grooves varies with the number of switches operated by the sequential timer.

Each of the concentrically spaced grooves has coded indicia or jog segments 54. These jog segments of the grooves would correspond to the rise and fall contours of the known type of actuator cam. Each segment is of predetermined length and displacement from the axis of the timing cam. The segments provide the desired actuation of the follower switch or follower switches operatively associated with that particular groove. The groove by means of its jog segments dictates whether a particular follower switch operatively controlled by that groove is "on" or "off." FIGURE 3 shows a top view of the timing cam and the plurality of concentrically disposed grooves disposed therein. Eight separate and distinct radially spaced grooves are illustrated, however, it is understood that the number of grooves shown is merely illustrative and is not intended to be limiting in scope. Any number of grooves can be utilized depending only on the number of circuits desired to be actuated by the timing cam.

FIGURE 4 illustrates the construction of the follower switch and FIGURE 5 shows the cooperation between the follower switch and one of the concentric grooves of the timing cam. Three structurally independent terminals 36 are operatively associated with each follower switch. The two terminals positioned furthest from each other carry fixed contacts 38. The two terminals and their respective fixed contacts form a fixed terminal and contact combination. The terminals carrying the fixed contacts are L-shaped. The terminals extend through insulative plate 37 and are fixedly coupled thereto. The third terminal projects through the insulative plate and is fixedly coupled thereto. The third terminal serves as a pivot means about which contact carrying blade 39 pivots. The contact carrying blade has contacts 40 and 41 provided at opposite extremities thereof. Movable contacts 40 and 41 engage or disengage their respective stationary contacts 38 in a sequence determined by the jog segments of the grooves in the timing cam. The contact carrying blade, the contacts, and the terminals are fabricated from any suitable electrically conductive material.

The contact carrying blade has its second side pivotably coupled at its midpoint to middle terminal 36 by a substantially triangular shaped spring 42. The spring is fabricated from any suitable resilient and electrically conductive material. Apex 43 of the triangular shaped spring is slotted so that the middle terminal 36 interfits therewith. Projections 44 of the middle terminal snap fit with the apertures 45 of the side portions 46 of the contact carrying blade thereby providing the contact carrying blade a point about which the blade can pivot. A rivet-shaped means 47 securely couples the triangular shaped spring to the contact carrying blade. The rivet-shaped means projects through aperture 48 which is centrally positioned in the contact carrying blade. Fixedly coupled in an axial recess (not shown) of the stem of the rivet-shaped means is a thin needle-shaped follower means 49.

FIGURES 2 and 5 illustrate the operative association that exists between the needle follower means and a groove of the timing cam. Referring particularly to FIGURE 5, the movement of the needle follower means in a selected groove of the timing cam is illustrated in full and dotted lines. It is seen that the displacement of the needle follower means in the horizontal direction is transferred to the contact carrying blade to thereby displace the blade from a neutral position as illustrated by the full lines to an engaged position with a terminal and fixed contact combination as illustrated by the dotted lines. Assuming a horizontal displacement of the needle follower means in the direction of arrow 50 by the appropriate jog segment of the cooperating groove, the needle follower means is displaced to a position illustrated by the dotted lines. The contact carrying blade is pivoted about a point determined by the triangular shaped spring and the cooperation between projections 44 of the middle terminal 36 and apertures 45 of the contact carrying blade. Movable contact 40 engages fixed contact 38 thereby providing an electrically conductive path through the terminal associated with contact 40 to the middle contact terminal. Assuming a horizontal displacement of the needle follower means in the direction of arrow 51 by the appropriate jog segment of the cooperating groove, the needle follower means is displaced to a position as illustrated by the dotted lines. The contact carrying blade is pivoted about a point in the manner as described hereinbefore. Movable contact 41 engages fixed contact 38 thereby providing an electrically conductive path through the terminal associated with contact 40 to the middle contact terminal. Upon continued rotation of the timing cam, it is seen that an appropriate jog segment of the groove will return the follower switch means to its initial or neutral position.

Having described the structure of the present invention, the cooperation between the described structural elements will be disclosed.

A drive means 11 with a constant rotary motion output has mechanically coupled thereto a pinion 12. The drive means rotates the pinion in a first predetermined direction and at a constant speed. The pinion is mechanically coupled to gear 15 thereby rotating the gear in a second predetermined direction at a constant rotary speed. A hub 17 is fixedly coupled to the gear and rotatable therewith. A drive cam 18 is fixedly coupled to the hub in spaced parallel relationship with respect to the gear 15. A second cam called a floating cam 31 is journalled to the hub in such a manner that the floating cam has a floating characteristic with respect to the hub and the drive cam. As the cams are rotationally displaced, a roller coupled to a follower arm and a rigid arm is displaced thereby storing energy in a tension spring operatively associated with the rigid arm. The energy is then released in a frontal direction so as to rotationally displace a ratchet wheel. It is seen that the ratchet wheel is driven in an intermittent manner. The intermittent movement of the ratchet wheel is transferred to the timing cam through the means of the cam shaft and a locking means. At least one follower switch rides in each of the concentrically disposed, radially spaced, continuous grooves of the timing cam. Each of the grooves is comprised of coded indicia or jog segments of varying radial distance from the axis of the timing cam. Each of the follower switches has a needle-shaped follower means that rides in the grooves and follows the jog segments thereof. The follower switch is comprised of the needle-shaped follower means, a blade having one movable contact at each extremity, a fixed contact overlying each movable contact, a terminal coupled to each fixed contact, and a third terminal coupled to the contact carrying blade serving as a pivot point for the blade and as an external contact to the blade. As the needle follower means rides in the groove following the indicia thereof, the contact carrying blade is pivoted about the point determined by the middle terminal of the three terminals in accordance with the indicia of the groove. The jog segments or indicia of the groove determine the position of the contact carrying blade, that is either engaged with one of the two fixed terminals and contact combinations or in the disengaged or neutral position.

It is seen by the structure utilized in the present invention that a minimum amount of physical space is used and at the same time the electric circuit capacity of the sequential timer is not diminished.

While the invention is illustrated and described in its preferred embodiment, it will be understood that modifications and variations may be effected without departing from the scope of the novel concepts of this invention and as set forth in the appended claims.

Having thus described my invention, I claim:

1. A timing device for sequentially actuating a plurality of electrical circuits comprising: means supporting a timing device; a drive means fixedly mounted on said means; an escapement means coupled to and rotatably driven by said drive means, said escapement means intermittently driving a ratchet wheel means; a cam shaft journalled to said mounting means, said cam shaft intermittently driven by said ratchet wheel means; a timing cam means carried by said cam shaft, said timing cam including a plurality of concentrically disposed radially spaced continuous grooves, each of said grooves including coded indicia; and a plurality of follower switches fixedly coupled to said mounting means, said switches including a pivotable contact carrying blade having a plurality of contact means, a fixed terminal and contact combination spaced from and overlying each of said contact means, a needle shaped follower means centrally coupled to said blade, and a terminal means and a spring means centrally coupled to said blade and cooperating to provide a pivot point for said blade, said follower means riding in one of said grooves, said follower means responsive to said coded indicia of said groove thereby pivoting said blade to open and close electrical circuits coupled to said fixed contacts.

2. A timing device for sequentially actuating a plurality of electrical circuits comprising: means supporting a timing device; a drive means fixedly mounted on said means; an escapement means coupled to and rotatably driven by said drive means, said escapement means intermittently driving a ratchet wheel means; a cam shaft journalled to said mounting means, said cam shaft intermittently driven by said ratchet wheel means; a timing cam means carried by said cam shaft, said timing cam including a plurality of concentrically disposed radially spaced continuous grooves, each of said grooves including coded indicia; and a plurality of follower switches fixedly coupled to said mounting means, said switches including a pivotable contact carrying blade having a plurality of contact means, a fixed terminal and contact combination spaced from and overlying each of said contact means, a needle-shaped follower means centrally coupled to a second side of said blade and cooperating to provide a pivot point for said blade, said needle follower means riding in one of said grooves, said follower means responsive to said coded indicia of said groove thereby pivoting said blade to open and close electrical circuits coupled to said fixed contacts.

3. A timing device for sequentially actuating a plurality of electrical circuits coupled to fixed contacts comprising: means supporting a timing device; a drive means fixedly mounted on said plates; an escapement means coupled to and rotatably driven by said drive means, said escapement means intermittently driving a ratchet wheel means; a cam shaft journalled to said mounting means, said cam shaft intermittently driven by said ratchet wheel means; a timing cam means carried by said cam shaft, said timing cam including a plurality of concentrically disposed radially spaced continuous grooves, each of said grooves including jog segments; and a plurality of follower switches fixedly coupled to said mounting means, said switches including a pivotable contact carrying blade having a contact means at each extremity thereof, a fixed terminal and contact combination spaced from and overlying each of said contact means, a needle-shaped follower means centrally coupled to a first side of said blade, and a terminal means and a spring means centrally coupled to a second side of said blade and cooperating to provide a pivot point for said blade, said needle follower means riding in one of said grooves, said follower means responsive to said jog segments of said groove thereby pivoting said blade to open and close electrical circuits coupled to said fixed contacts.

4. A timing device for sequentially actuating a plurality of electrical circuits coupled to fixed contacts comprising: means supporting a timing device, said means including a pair of plates in spaced parallel relationship; a drive means fixedly mounted on a first one of said plates; an escapement means coupled to and rotatably driven by said drive means, said escapement means intermittently driving a ratchet wheel means; a cam shaft journalled between said pair of plates, said cam shaft coupled to and intermittently driven by said ratchet wheel means; a disc-shaped timing cam means carried by said cam shaft, said timing cam including a plurality of concentrically disposed radially spaced continuous grooves on one face of said timing cam, each of said grooves including jog segments; and a plurality of follower switches fixedly coupled to a second one of said plates, said switches including a pivotable contact carrying blade having a contact means at each extremity thereof, a fixed terminal and contact combination spaced from and overlying each of said contact means, a needle-shaped follower means centrally coupled to a first side of said blade, and a terminal means and a spring means centrally coupled to a second side of said blade and cooperating to provide a pivot point for said blade, said needle follower means riding in one of said grooves, said follower means responsive to said jog segments of said groove thereby pivoting said blade to open and close electrical circuits coupled to said fixed contacts.

5. A timing device for sequentially actuating a plurality of electrical circuits coupled to fixed contacts comprising: means supporting a timing device, said means including a pair of plates in spaced parallel relationship; a drive means fixedly mounted on a first one of said plates; an escapement means including a cam assembly means coupled to and rotatably driven by said drive means, and a knee action means coupled to said cam assembly, said knee action means intermittently driving a ratchet wheel means; a cam shaft journalled between said pair of plates, said cam shaft coupled to and intermittently driven by said ratchet wheel means; a disc-shaped timing cam means carried by said cam shaft, said timing cam including a plurality of concentrically disposed radially spaced continuous grooves on one face of said timing cam, each of said grooves including jog segments; and a plurality of follower switches fixedly coupled to a second one of said plates, said switches including a pivotable contact carrying blade having a contact means at each extremity thereof, a fixed terminal and contact combination spaced from and overlying each of said contact means, a needle-shaped follower means centrally coupled to a first side of said blade, and a terminal means and a spring means centrally coupled to a second side of said blade and cooperating to provide a pivot point for said blade, said needle follower means riding in one of said grooves, said follower means responsive to said jog segments of said groove thereby pivoting said blade to open and close electrical circuits coupled to said fixed contacts.

6. A time controlled switching means comprising: a rotatably driven timing cam means, said timing cam including a plurality of grooves cut in a surface thereof, each of said grooves including coded indicia; and a plurality of follower switches fixedly connected to a mounting means, said switches including pivotal contact carrying means, fixed contact means carred by said mounting means and normally spaced from said contacts of said contact carrying means, follower means connected to a first side of said contact carrying means, terminal means carried by said mounting means, and energy storage means connected to said terminal means and to a second side of said contact carrying means, said terminal means and said energy storage means cooperating to provide a pivot point for said contact carrying means, said follower means riding in one of said grooves, said follower means responsive to said coded indicia of said groove thereby pivoting said contact carrying means to open and close electrical circuits coupled to said fixed contact means as said timing cam is rotatably displaced.

7. A time controlled switching means comprising: a rotatably driven timing cam means, said timing cam including a plurality of concentrically disposed radially spaced continuous grooves cut in the face thereof, each of said grooves including changes in the radius thereof; and a plurality of follower switches fixedly connected to a mounting means, said switches including pivotal contact carrying means, fixed contact means carried by said mounting means and normally spaced from said contacts of said contact carrying means, follower means connected to a first side of said contact carrying means, terminal means carried by said mounting means, and energy storage means connected to said terminal means and to a second side of said contact carrying means, said terminal means and said energy storage means cooperating to provide a pivot point for said contact carrying means, said follower means riding in one of said grooves, said follower means responsive to said changes in said radius of said groove thereby pivoting said contact carrying means to open and close electrical circuits coupled to said fixed contact means as said timing cam is rotatably displaced.

8. A time controlled switching means comprising: a rotatably driven disc-shaped timing cam means, said timing cam including a plurality of concentrically disposed radially spaced continuous grooves cut in one face thereof, each of said grooves including jog segments; and a plurality of follower switches fixedly connected to a mounting means, said switches including pivotal contact carrying means, fixed contact means carried by said mounting means and normally spaced from said contact of said contact carrying means, follower means connected to a first side of said contact carrying means, terminal means carried by said mounting means, and energy storage means connected to said terminal means and to a second side of said contact carrying means, said terminal means and said energy storage means cooperating to provide a pivot point for said contact carrying means, said follower means riding in one of said grooves, said follower means responsive to said jog segments of said groove thereby pivoting said contact carrying means to open and close electrical circuits coupled to said fixed contact means as said disc-shaped timing cam is rotatably displaced.

9. A time controlled switching means comprising: a rotatably driven cam shaft; disc-shaped timing cam means carried by said cam shaft, said timing cam including a plurality of concentrically disposed radially spaced continuous grooves cut in one face thereof; each of said grooves including jog segments; and a plurality of follower switches fixedly connected to a mounting means, said switches including pivotal contact carrying means, fixed contact means carried by said mounting means and normally spaced from said contact of said contact carrying means, needle-shaped follower means connected to a first side of said contact carrying means, terminal means carried by said mounting means, and energy storage means connected to said terminal means and to a second side of said contact carrying means, said terminal means and said energy storage means cooperating to provide a pivot point for said contact carrying means, said needle follower means riding in one of said grooves, said follower means responsive to said jog segments of said groove thereby pivoting said contact carrying means to open and close electrical circuits coupled to said fixed contact means as said disc-shaped timing cam is rotatably displaced.

10. A time controlled switching means comprising: a rotatably driven cam shaft; disc-shaped timing cam means carried by said cam shaft, said timing cam including a plurality of concentrically disposed radially spaced continuous grooves cut in one face thereof, each of said grooves including jog segments; and a plurality of follower switches fixedly connected to a mounting means, said switches including pivotal contact carrying means having a contact means at each extremity thereof, fixed contact means carried by said mounting means spaced from and overlying said contacts of said contact carrying means, needle-shaped follower means connected to the midpoint of a first side of said contact carrying means, terminal means carried by said mounting means, and bias means connected to said terminal means and connected to the midpoint of a second side of said contact carrying means, said terminal means and said bias means cooperating to provide a pivot point for said contact carrying means, said needle follower means riding in one of said grooves, said follower means responsive to said jog segments of said groove thereby pivoting said contact carrying means to open and close electrical circuits coupled to said fixed contact means as said disc-shaped timing cam is rotatably displaced.

11. A follower switch comprising: mounting means; a pivotal contact carrying blade having a contact means at each extremity thereof; a fixed contact spaced from and overlying each of said contacts of said contact carrying blade; follower means connected to a first side of said blade; and a terminal means and bias means coupled to a second side of said blade and cooperating to provide a pivot point for said blade, said follower means responsive to a condition thereby pivoting said blade to open and close electrical circuits coupled to said fixed contacts.

12. A follower switch comprising: mounting means; a pivotal contact carrying blade having a contact means at each extremity thereof; a fixed contact spaced from and overlying each of said contacts of said contact carrying blade; follower means centrally connected to a first side of said blade; and terminal means and spring means centrally coupled to a second side of said blade and cooperating to provide a pivot point for said blade, said follower means responsive to a condition thereby pivoting said blade to open and close electrical circuits coupled to said fixed contacts.

13. A follower switch comprising: mounting means; a pivotal contact carrying blade having a contact means at each extremity thereof; a fixed terminal and contact combination spaced from and overlying each of said contacts of said contact carrying blade; needle-shaped follower means centrally connected to a first side of said blade, terminal means carried by said mounting means; and spring means connected to said terminal means and centrally connected to a second side of said contact carrying blade and cooperating to provide a pivot point for said blade, said needle follower means responsive to a condition thereby pivoting said blade to open and close electrical circuits coupled to said fixed contacts.

14. A follower switch comprising: mounting means; a pivotal contact carrying blade including a contact means at each extremity thereof and a pair of apertured sides centrally positioned on said blade; fixed terminal and contact combination spaced from and overlying each of said contacts of said contact carrying blade; needle-shaped follower means centrally connected to a first side of said blade; terminal means carried by said mounting means, said terminal means including oppositely extending projections interfitting with said apertures of said contact carrying blade thereby seating said blade; and triangular shaped spring means having one corner connected to said terminal means and having its base connected to the central portion of said blade said terminal means and said spring cooperating to provide a pivot point for said blade, said needle follower means responsive to a condition thereby pivoting said blade to open and close electrical circuits coupled to said fixed contacts.

15. A follower switch comprising: mounting means; a pivotal contact carrying blade including contact means at each extremity thereof and a pair of apertured sides centrally positioned on said blade and extending outwardly at a right angle with the major plane of said blade; fixed terminal and contact combination spaced from and overlying each of said contacts of said blade; needle-shaped follower means centrally connected to a first side of said blade; terminal means carried by said mounting means, said terminal means including oppositely extending projections, each of said projections extending at a right angle with the major plane of said terminal means and interfitting with said apertures of said blade thereby seating said blade; and triangular shaped spring having one corner connected to said terminal means and having its base connected to the central portion of said blade, said terminal means and said spring cooperating to provide a pivot point for said blade, said needle follower means responsive to a condition thereby pivoting said blade to open and close electrical circuits coupled to said fixed contacts.

References Cited by the Examiner

UNITED STATES PATENTS

| | | | |
|---|---|---|---|
| 2,029,667 | 2/1936 | Maxwell | 200—35 |
| 2,804,527 | 8/1957 | Snyder et al. | 200—153 |
| 2,877,317 | 3/1959 | Euler et al. | 200—38 X |
| 3,053,947 | 9/1962 | Bowman et al. | 200—38 |
| 3,064,098 | 11/1962 | Nicolaus | 200—38 X |

BERNARD A. GILHEANY, *Primary Examiner.*

G. MAIER, *Assistant Examiner.*